(12) United States Patent
Basavaraj et al.

(10) Patent No.: US 9,913,252 B2
(45) Date of Patent: Mar. 6, 2018

(54) COMMUNICATION SYSTEM AND METHOD FOR MULTI-LINE, MULTI-DEVICE SERVICE WITH USER CAPABILITY DISCOVERY

(71) Applicant: MAVENIR SYSTEMS, INC., Richardson, TX (US)

(72) Inventors: Vivek Basavaraj, Richardson, TX (US); Anish Sharma, Richardson, TX (US); Jyotirmay Bareria, Richardson, TX (US)

(73) Assignee: MAVENIR SYSTEMS, INC., Richardson, TX (US)

( * ) Notice: Subject to any disclaimer, the term of this patent is extended or adjusted under 35 U.S.C. 154(b) by 110 days.

(21) Appl. No.: 14/992,848

(22) Filed: Jan. 11, 2016

(65) Prior Publication Data
US 2017/0201965 A1 Jul. 13, 2017

(51) Int. Cl.
| | | |
|---|---|---|
| *H04W 48/18* | (2009.01) | |
| *H04L 29/06* | (2006.01) | |
| *H04M 1/725* | (2006.01) | |
| *H04W 72/02* | (2009.01) | |
| *H04W 72/04* | (2009.01) | |
| *H04L 29/08* | (2006.01) | |

(52) U.S. Cl.
CPC ........... *H04W 72/02* (2013.01); *H04L 65/105* (2013.01); *H04L 65/1006* (2013.01); *H04L 65/1016* (2013.01); *H04L 65/1073* (2013.01); *H04L 67/24* (2013.01); *H04M 1/72522* (2013.01); *H04W 48/18* (2013.01); *H04W 72/048* (2013.01)

(58) Field of Classification Search
CPC ... H04W 72/02; H04W 48/18; H04W 72/048; H04L 65/1016; H04L 65/105; H04L 65/1006; H04M 1/72522
See application file for complete search history.

(56) References Cited

U.S. PATENT DOCUMENTS

| | | | |
|---|---|---|---|
| 8,825,773 B1 * | 9/2014 | Gauvin | ................... H04L 51/12 |
| | | | 709/206 |
| 2008/0141111 A1 * | 6/2008 | Morris | .................... H04L 67/24 |
| | | | 715/230 |
| 2008/0288649 A1 | 11/2008 | Burckart et al. | |
| 2009/0029726 A1 * | 1/2009 | Danne | ................. H04L 65/1006 |
| | | | 455/466 |

(Continued)

FOREIGN PATENT DOCUMENTS

WO 2008115100 A1 9/2008

OTHER PUBLICATIONS

Singh V K et al, "Presence Traffic Optimization Techniques", Internet Citation, Oct. 28, 2006 (Oct. 28, 2006). pp. 1-16. XP002486721. Retrieved from the Internet:URL:https://mice.cs.columbia.edu/getTechreport.php?techreportiD=426.

(Continued)

*Primary Examiner* — Brian D Nguyen
(74) *Attorney, Agent, or Firm* — Ohlandt, Greeley, Ruggiero & Perle, L.L.P.

(57) ABSTRACT

Communication systems and methods suitable for use with multiple lines associated with one or more devices are disclosed. Exemplary systems and methods provide multi-line, multi-device device capability discovery that allow capability discovery of devices with shared lines.

18 Claims, 4 Drawing Sheets

(56) References Cited

U.S. PATENT DOCUMENTS

| | | | |
|---|---|---|---|
| 2009/0055899 A1 | 2/2009 | Deshpande et al. | |
| 2012/0042015 A1* | 2/2012 | Crawford | H04L 41/06 709/206 |
| 2012/0102150 A1* | 4/2012 | Wang | H04L 67/24 709/217 |
| 2012/0215928 A1 | 8/2012 | Boberg et al. | |
| 2012/0220307 A1* | 8/2012 | Wohlert | H04W 4/02 455/456.1 |
| 2013/0166703 A1* | 6/2013 | Hammer | H04L 41/50 709/220 |
| 2014/0068710 A1* | 3/2014 | Lau | G06F 21/00 726/3 |
| 2014/0344663 A1* | 11/2014 | Joel | G06F 17/2264 715/234 |
| 2016/0353269 A1* | 12/2016 | Kasslin | H04W 8/005 |

OTHER PUBLICATIONS

Extended European Search Report and Opinion dated May 3, 2017 from corresponding EP Application No. 16151267.8, 9 pages.

* cited by examiner

COMMUNICATION SYSTEM AND METHOD FOR MULTI-LINE, MULTI-DEVICE SERVICE WITH USER CAPABILITY DISCOVERY

FIELD OF THE DISCLOSURE

The present disclosure generally relates to communication systems and methods, and more particularly to communication systems and methods that allow for the use of multiple lines on one or more devices in a communications network.

BACKGROUND OF THE DISCLOSURE

Various mobile devices, also referred to herein a User Equipment (UE), can operate in wireless communication networks that provide high-speed data and/or voice communications. The wireless communication networks can implement circuit-switched (CS) and/or packet-switched (PS) communication protocols to provide various services. For example, a UE can operate in accordance with one or more radio technology such as: Universal Terrestrial Radio Access (UTRA), Evolved UTRA (E-UTRA), and Global System for Mobile Communications (GSM) as part of a Universal Mobile Telecommunication System (UMTS). Descriptions and specifications for UTRA, E-UTRA, GSM, UMTS and LTE (Long Term Evolution) protocols are available from the Third Generation Partnership Project (3GPP), which is a partnership that united telecommunications standards development organizations and provides their members with an environment to produce reports and specifications that define 3GPP technologies.

Evolved Packet Core (EPC) technology was developed based on the 3GPP core network architecture. In EPC, user data and the signalling data are separated into the user plane and the control plane to allow a network operator to easily adapt and scale their networks. At a high level, EPC architecture includes four basic network elements: the Serving Gateway (SGW), the Packet Data Network Gateway (PDN GW or PGW), the Mobility Management Entity (MME), and the Home Subscriber Server (HSS). The EPC can be connected to external networks, which can include an IP Multimedia Core Network Subsystem (IMS).

An IMS is generally configured to facilitate the use of Internet protocol (IP) for packet communications, such as telephony, facsimile, email, Internet access, Web Service, Voice over IP (VoIP), instant messaging (IM), videoconference sessions, video on demand (VoD), and the like, over wired and/or wireless communication networks.

As discussed in more detail below, typical communication networks generally provide a single line or number that is associated with a UE. Various users can have several devices, each with its own line. In some cases, a user may wish to use one or more lines with one or more devices and/or share a line with other users. While some over-the-top application may provide an ability for a user to use a second line on a device, such applications generally do not allow for multiple lines to be used on multiple devices in an efficient and/or transparent manner. Further, such systems generally do not allow discovery of capabilities of multiple devices and/or of devices of multiple users. As a result, a user may not know what applications are available for use on a particular device. Accordingly, improved systems for providing multi-line, multi device capabilities discovery are desired.

BRIEF DESCRIPTION OF THE DRAWING FIGURES

Subject matter of the present disclosure is particularly pointed out and distinctly claimed in the concluding portion of the specification. A more complete understanding of the present disclosure, however, may be obtained by referring to the detailed description and claims when considered in connection with the drawing figures.

Figure 1:
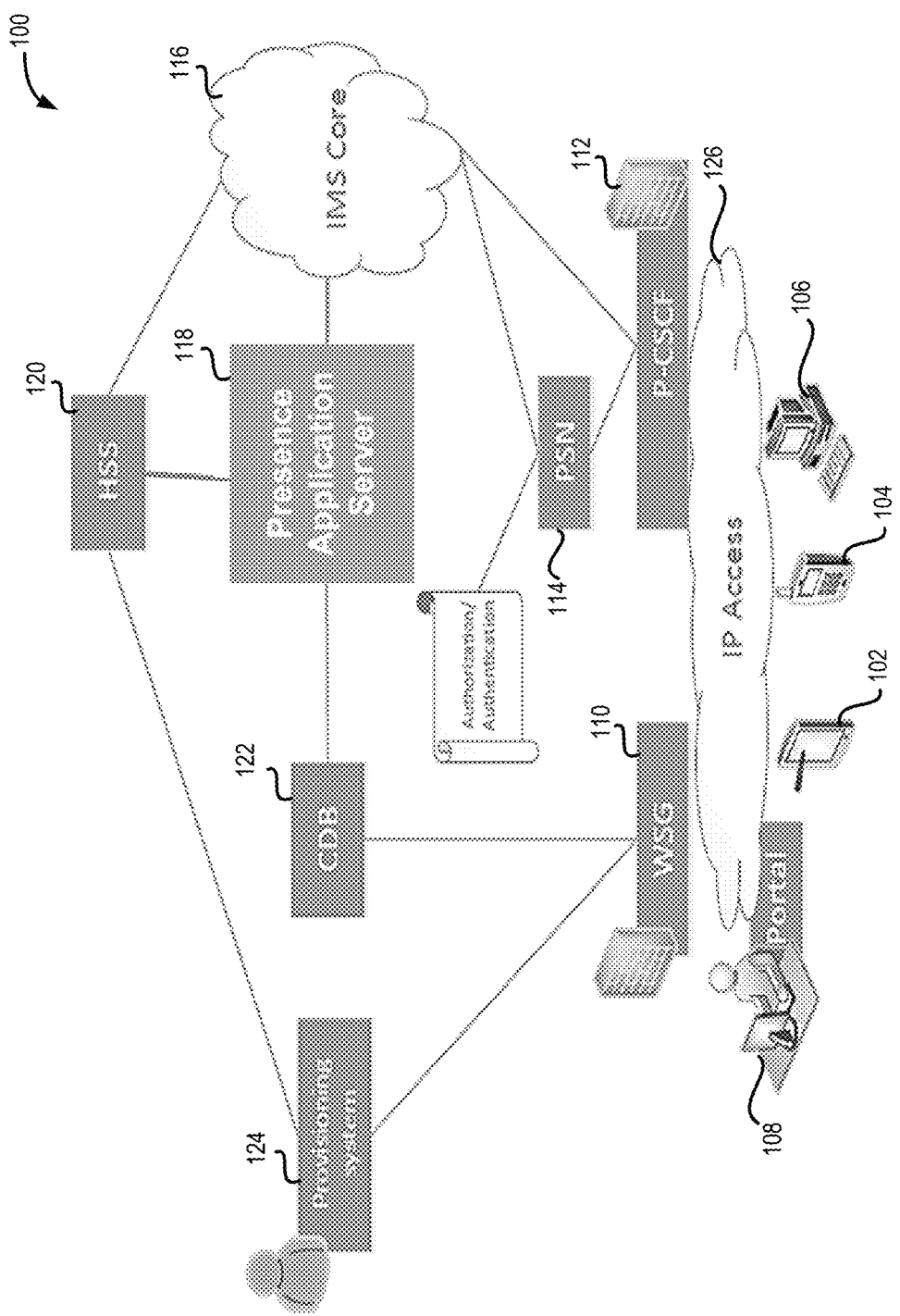
FIG. 1 illustrates a network architecture diagram of an exemplary communication network according to the present disclosure.

It will be appreciated that elements in the figures are illustrated for simplicity and clarity and have not necessarily been drawn to scale. For example, the dimensions of some of the elements in the figures may be exaggerated relative to other elements to help to improve understanding of illustrated embodiments of the present disclosure.

DETAILED DESCRIPTION OF EXEMPLARY EMBODIMENTS

The description of various embodiments of the present disclosure provided below is merely exemplary and is intended for purposes of illustration only; the following description is not intended to limit the scope of an invention disclosed herein. Moreover, recitation of multiple embodiments having stated features is not intended to exclude other embodiments having additional features or other embodiments incorporating different combinations of the stated features.

Exemplary embodiments of the disclosure are described herein in terms of various functional components and various steps. It should be appreciated that such functional components may be realized by any number of hardware or structural components configured to perform the specified functions. Further, it should be noted that while various components may be suitably coupled or connected to other components within exemplary systems, such connections and couplings can be realized by direct connection between components, or by connection through other components and devices located therebetween.

Various embodiments of the disclosure provide systems and methods for allowing users to use multiples lines on one or more devices. For example, a single device can be used to make and/or receive communications using two or more lines and/or multiple devices can use the same line, such that a communication to the line is sent to all of the devices using that line. This technology is generally referred to herein as multi-line, multi-device or MLMD technology.

Exemplary systems and methods in accordance with the disclosure provide MLMD device capability discovery, which can be transparent to a user. As set forth in more detail below, exemplary systems and methods allow capability discovery of users' devices that can have disparate capabilities. Exemplary systems and methods can discover device capability when a line is used by different users and/or on different devices.

As noted above, traditionally communication networks tie a number to a user and often to a device—i.e., devices are typically locked by operators, such as telecommunication companies, to a particular number/line when a device or line is purchased, and users are generally not allowed to use any other number on the device, except by using an Over The Top (OTT) application or a device vendor native application to allow line sharing to be a native feature of the device. Such OTT applications can make line sharing a native feature and typically require authorization for use by the operator. Such OTT applications or native applications work in conjunction with an operator's network to achieve the desired functionality. In this case, the service logic to allow line sharing is in the network and is tied to a user's subscription. Such systems generally have no defined mechanism to discover peer user or other device communications features capabilities in cases in which a user has shared a line with another user or is using a line on another device (a device not originally assigned to the line). Rather, such systems generally can discover capabilities of one device associated with one line.

In contrast to such techniques, the present disclosure provides exemplary MLMD systems and methods that provide a relatively easy user experience, reduce a dependency on existing network functions to provide the desired functionality, and allow discovery of device capabilities of multiple devices associated with one or more lines.

Examples of the disclosure are discussed in connection with providing various functions in connection with an IP Multimedia Core Network Subsystem (IMS) network using session-initiation-protocol (SIP). However, unless otherwise noted, the disclosure is not limited to use with such networks and/or protocols, and to the extent compatible, can be used in connection with other communication networks, network architectures, and/or protocols.

Turning now to the figures, FIG. 1 illustrates a network or system 100 that includes user devices or user equipment (UE) 102-106 (also referred to herein as devices), a portal 108 to an IP access layer 126, a web service gateway 110, a contact point (e.g., a P-CSCF) 112, a proxy service node (PSN) 114, an IMS core 116, one or more Presence application servers (P-AS) 118, a home subscriber server (HSS) 120, a converged database (CDB) 122, and a provisioning system 124. As set forth in more detail below, network 100, and in particular, PSN 114 and one or more P-AS 118, allow multiple devices (e.g., devices 102-106) to have access to and use multiple lines in a relatively easy manner and allow discovery of the devices' capabilities. In accordance with exemplary embodiments of the disclosure, the line sharing service and device capability discovery can be access and/or device agnostic, i.e., any IP access which can support IMS communication, in the illustrated example, can be used by a client and any device that has IP connectivity can use the MLMD service.

User devices 102-106, also referred to herein as user equipment (UE), can include any suitable device with wired and/or wireless communication features. For example, user devices 102-106 can include a wearable device, a tablet computer, a smart phone, a personal (e.g., laptop) computer, a streaming device, such as a game console or other media streaming device, such as Roku, Amazon Fire TV, or the like, a mobile station, a subscriber station, a mobile unit, a subscriber unit, a wireless unit, a mobile device, a wireless device, a wireless communication device, an access terminal, a mobile terminal, a handset, a user agent, or other suitable device.

In accordance with various embodiments of the disclosure, one or more of devices 102-106 includes a client. As used herein, client can refer to a downloadable OTT application, a native phone application, a soft phone or a browser-based client. The client performs one or more client functions as described herein. For example, the client can include a user interface to display or present multiple lines available for use on a device. Further, the client can allow a user to select a line from the available lines for registration and/or use. The client can also allow a user to enter account information associated with one or more lines that can be used by a network provider, such as a telecommunications company. Further, when used in connection with methods and systems described herein, a client can display device capabilities that are available for a selected line on one or more other devices. The client can also send a PUBLISH request to advertise communication features set capabilities, as described below. The client can allow a user to log in to access various system and method features described herein. Additional exemplary client functions are described below.

Portal 108 can include any suitable portal, such as a portal provided by a network (e.g., telecommunications) provider. A user can use portal 108 to gain network access, register devices and/or lines, perform operations related to line sharing, and/or the like.

Web service gateway (WSG) 110 is a network gateway that allows one or more devices to secure network access. WSG 110 can also act as an orchestrator between the operator backend systems and CDB 122 for service-related provisioning. WSG handles records from provisioning system 124 and can interact with CDB 122 or another network node to provision a user to allow a user to use one or more of the MLMD features described herein. For example, WSG can receive information from provisioning system 124 and convert that information to a message format understood by CDB 122, thereby essentially hiding CDB 122 provisioning complexities from an operator's system. Exemplary WSG 110 front-end operations allow a client to create/manage devices sharing one or more lines and to activate/deactivate the line(s) on the device(s). WSG 110 can also support authorization/authentication for line(s) selected by a client—e.g., in association with an operator's backend provisioning node.

In the example illustrated in FIG. 1, a network contact point (e.g., a P-CSCF) 112 is a session-initiation-protocol (SIP) first point of contact with an IMS network. Although illustrated separately, P-CSCF can form part of IMS core 116.

PSN 114 is a network node that enables registration of multiple lines associated with a device. PSN 114 can be a standalone node in the network or may be co-located with a proxy or edge node, e.g., an A-Session Border Controller (A-SBC), Proxy-CSCF (P-CSCF), or Access Transfer Control Function (ATCF) node. In accordance with exemplary aspects of the disclosure, PSN 114 is a signaling-only node; however, nothing prevents media anchoring on PSN 114.

As discussed in more detail below, PSN 114 can function as an I-CSCF and can authorize and/or authenticate one or more lines selected by a user (e.g., using a device 102-106 having a suitable client). Once the lines are authorized and/or authenticated, PSN 114 communicates a register message (e.g., a REGISTER request) for each line to IMS core 116. Post authorization, PSN 114 performs PUBLISH forking, i.e., PSN sends a PUBLISH message for each selected line towards an I-CSCF in IMS core 116. PSN 114 registration is discussed in more detail in application Ser. No. 14/992,791, filed Jan. 11, 2016, and entitled SYSTEMS AND METHODS FOR MULTI-LINE, MULTI-DEVICE SERVICE IN A COMMUNICATIONS NETWORK, which is incorporated herein by reference, to the extent the contents thereof do not conflict with the present disclosure.

IMS core 116 can include typical IMS core functions, such as call session control (routing) functions. IMS core 116 generally includes an interrogating CSCF (I-CSCF) node and a serving CSCF (S-CSCF) node. The I-CSCF and S-CSCF described herein perform typical I-CSCF and S-CSCF functions.

Presence application servers (P-AS) 118 can perform a variety of functions. In accordance with exemplary embodiments of the disclosure, P-AS 118 interacts with S-CSCF using SIP. Exemplary systems can include other application servers, such as telephony application servers, messaging application servers, and the like. By way of example, presence application server 118 provides a service that manages collection and controlled dissemination of Presence Information (e.g., device capability information) of a user, line, and/or device. Exemplary presence functions are described in "OMA-TS-Presence_SIMPLE-V2_0" specification, the contents of which are hereby incorporated herein by reference, to the extent such contents do not conflict with the present disclosure. Various functions of P-AS 118 are described in more detail below.

In accordance with various examples of the disclosure, service logic related to handling of PUBLISH for shared lines that have been forked (described in more detail below) by PSN 144 is executed in P-AS 118. The P-AS 118 can receive forked PUBLISH from PSN 114 as described below by a shared line for the device capabilities for a user and can also receive PUBLISH from the user's own device to advertise its capabilities.

HSS 120 is a database that supports the IMS network entities that handle communications. HSS 120 can contain, for example, subscription-related information, including phone numbers, billing information, on which nodes users are registered, authentication information, user identity information, and the like. HSS 120 can assist IMS core 116 with routing procedures.

CDB 122 stores service-related data, including line-sharing information. As shared lines are added or removed, the information is stored/updated in CDB 122. The information can be updated on CDB 122 using an operator's provisioning system to update CDB 122. Alternatively, as noted above, WSG 110 can perform front-end operations on behalf of CDB 122. This front-end function can, but need not, be co-located with CDB 122. The service data in the CDB are accessible to application servers, which are responsible for executing the service logic of the server.

Provisioning system 124 can be a typical operator provisioning system. Provisioning system 124 can be used to assign one or more lines to a user and/or to one or more devices. Provisioning system can use information, such as user identity, user address, and lines associated with a user. Provisioning system 124 can provision a user to, for example, WSG 110, CDB 110, or HSS 120.

With prior IMS-based networks, line sharing is generally done by way of upgrading existing network functions. The lines that are to be shared are put together in an Implicit Registration Set (IRS) in the Home Subscriber Server (HSS) and then the rest of the IMS functions, such as Call Session Control Functions (CSCFs) and Application Servers (AS), work with information stored in the IRS. This architecture relies on existing IMS functions and has several shortcomings. One such shortcoming is that the IRS on HSS is updated whenever a user permits another user to use a line or the user revokes permissions on a shared line. Also, the IRS on the HSS is typically separate for business and personal lines for reasons related to accounting, ownership, management, and the like. Combining information associated with different lines in one IRS is a cumbersome operation, requiring changes in an operator's backend system. Such a process is tedious and error prone when users try to share lines with each other for short periods of time. As a result, operators typically put restrictions on line sharing (e.g., business lines can only be shared with users belonging to same company/business group). This solution may not be attractive to many consumers. Further, such systems generally do not present all available lines to a user to allow the user to view and select an available line from a plurality of available lines—e.g., at the time of actual usage, e.g., presented in a unified message box, using a graphical interface, or the like.

In addition, methods for performing communications set capability discovery using SIP OPTIONS exchange between users or using SIP Presence PUBLISH and SUBSCRIBE/NOTIFY mechanisms as defined by GSMA "Rich Communication Suite 5.1 Advanced Communications Services and Client Specification," the contents of which are incorporated herein by reference to the extent such contents do not conflict with the present disclosure, are generally limited to the lines and devices owned by a user. Such methods have shortcomings in addressing the capability discovery for scenarios in which a user is using multiple line numbers and has multiple devices. One particular shortcoming is that using SIP OPTIONS or SIP Presence PUBLISH and SUBSCRIBE/NOTIFY techniques depend on the existing network nodes and do not capture the notion of a line number shared by one or more users on more than one device. Also existing methods that define the Presence composition policy for a case where a user has multiple devices does not define the Presence composition policy to be applied in a case in which the user has shared his line with other users and logged in on the other user's device(s).

Exemplary systems and networks, such as network 100, include one or more presence application servers 118 and one or more CDB 122 for storing (e.g., all) service data. Also, PSN 114 is provided to authorize and optionally authenticate multiple lines associated with a user and/or device and to provide PUBLISH forking. This allows the MLMD functions described herein, including MLMD device capability discovery of multiple users, lines, and/or devices, without requiring changes on an HSS (e.g., HSS 120).

In accordance with various examples of the disclosure, a client, registrar (S-CSCF) within IMS core 116 and application servers in network 100 support Contact bindings based on the instance-id present in a "sip.instance" parameter in the Contact header. The instance-id is a globally unique value that corresponds to a device and can be based on the Information Mobile Station Equipment Identity (IMEI) of the communication device.

An exemplary method of using a network, such as network 100, with SIP, is described below. The method below is conveniently described in connection with using network 100 and SIP. However, various methods in accordance with the disclosure can suitably be used with other networks and/or other protocols.

In accordance with exemplary aspects of the illustrative embodiments, a user registers an IMPU (IMS Public User Identity) in the network (e.g., network 100). Activation of a line on a device corresponds to registering the line in the network. During this process, a user can be presented, via a user interface of a client on a device (e.g., device 102, 104, or 106), a list of available lines, and the user can select, using the client/user interface, which line(s) to be registered for service. The registration process is described in greater detail in application Ser. No. 14/992,791.

In accordance with various examples of the disclosure, P-CSCF 112 logic is configured such that it sends only the REGISTER and PUBLISH messages to PSN 114 and the rest of the SIP requests are routed to the S-CSCF serving the AoR. The service logic related to handling calls and messages is executed in application servers that have access to the data stored in CDB 122. Any change by the user or the operator affecting the service data is stored/updated in CDB 122. Upon receiving a Third Party Registration (TPR) from the S-CSCF, application server(s) can fetch the service data from CDB 122. The service data can contain, for example, but is not limited to: 1) a list of lines which are eligible for service; 2) a list of users to be alerted when a call/message is received for a shared line (this allows presenting the call/message to the user who has activated a shared line; the user here corresponds to a Primary Line); and 3) a list of users (e.g., corresponding to a Primary Line) who are currently using a shared line (i.e., those users who activated one or more shared lines on their devices).

Exemplary mobile terminated request data flow and an exemplary multi-line registration request are also disclosed in application Ser. No. 14/992,791, filed Jan. 11, 2016, and entitled SYSTEMS AND METHODS FOR MULTI-LINE, MULTI-DEVICE SERVICE IN A COMMUNICATIONS NETWORK, which is incorporated herein by reference, to the extent the contents thereof do not conflict with the present disclosure. Techniques for MLMD switching between network types (e.g., packet switched and network switched) are disclosed in application Ser. No. 14/992,771, filed Jan. 11, 2016, and entitled SYSTEMS AND METHODS FOR SINGLE RADIO VOICE CALL CONTINUITY IN A MULTI-LINE, MULTI-DEVICE SERVICE ENVIRONMENT IN A COMMUNICATIONS NETWORK, which is incorporated herein by reference, to the extent the contents thereof do not conflict with the present disclosure.

After registration of one or more lines, the client sends a SIP PUBLISH request to the network (e.g., P-CSCF 112) to advertise its communication features set capabilities. The lines selected by the user are put in a SIP header within the PUBLISH request. As noted above, the SIP header is referred as P-Multi-Line-Association; however, an existing header or other-named header can also be expanded to achieve the same functionality. P-CSCF 112 processes the request (e.g., as usual) and based on presence of the SIP header carrying selected lines, forwards the request to PSN 114. One way to achieve this in P-CSCF 112 is to manipulate the outgoing request just before its put on wire in a way so as to add a Route header pointing to PSN 114 when P-Multi-Line-Association header is present in PUBLISH requests. This makes sure initial/refresh/deregister PUBLISH requests are handled by PSN 114 for the service.

Figure 4:
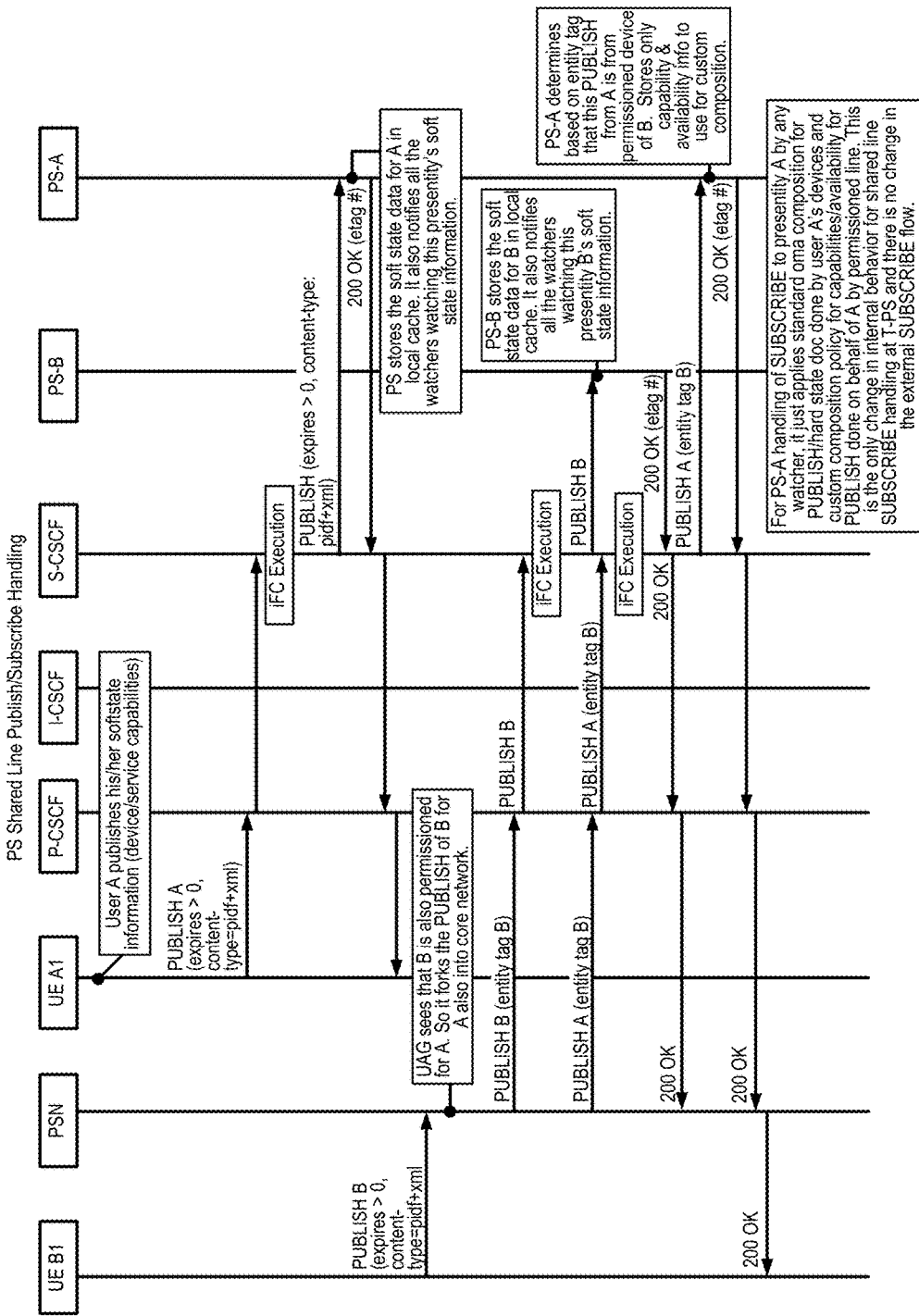
FIG. 4 illustrates a call flow diagram in accordance with further exemplary embodiments of the disclosure.

Post authorization and optional and optional authentication, PSN 114 sends a PUBLISH message for each selected line I-CSCF 202, as illustrated in FIG. 4. In this case, PSN 114 acts as a P-CSCF.

Figure 2:
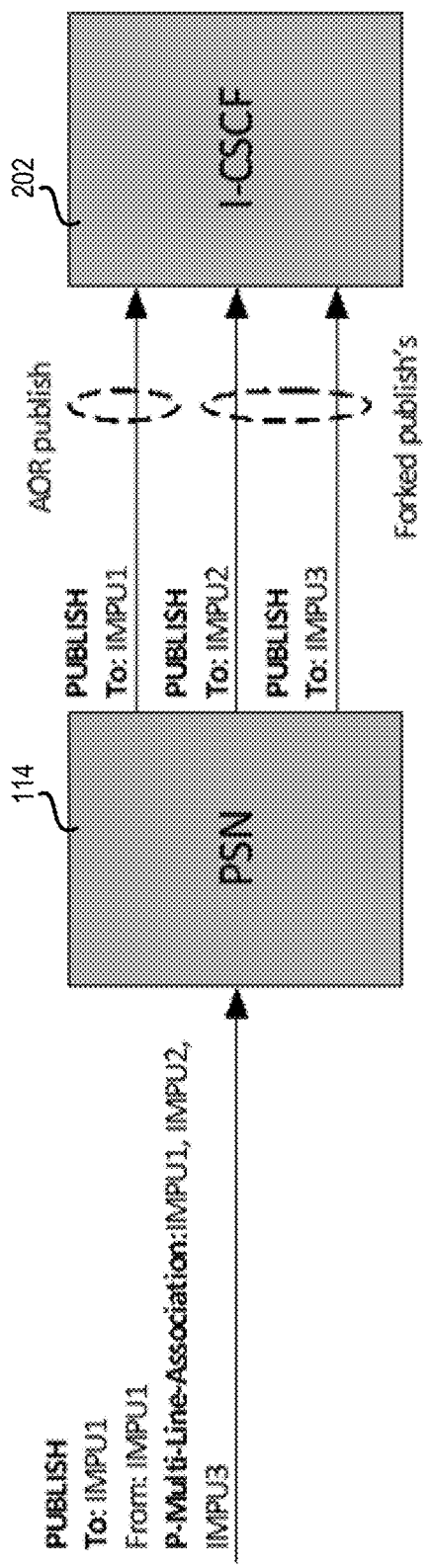
FIG. 2 illustrates a data flow diagram of an exemplary publish fork process according to the present disclosure.
Figure 3:
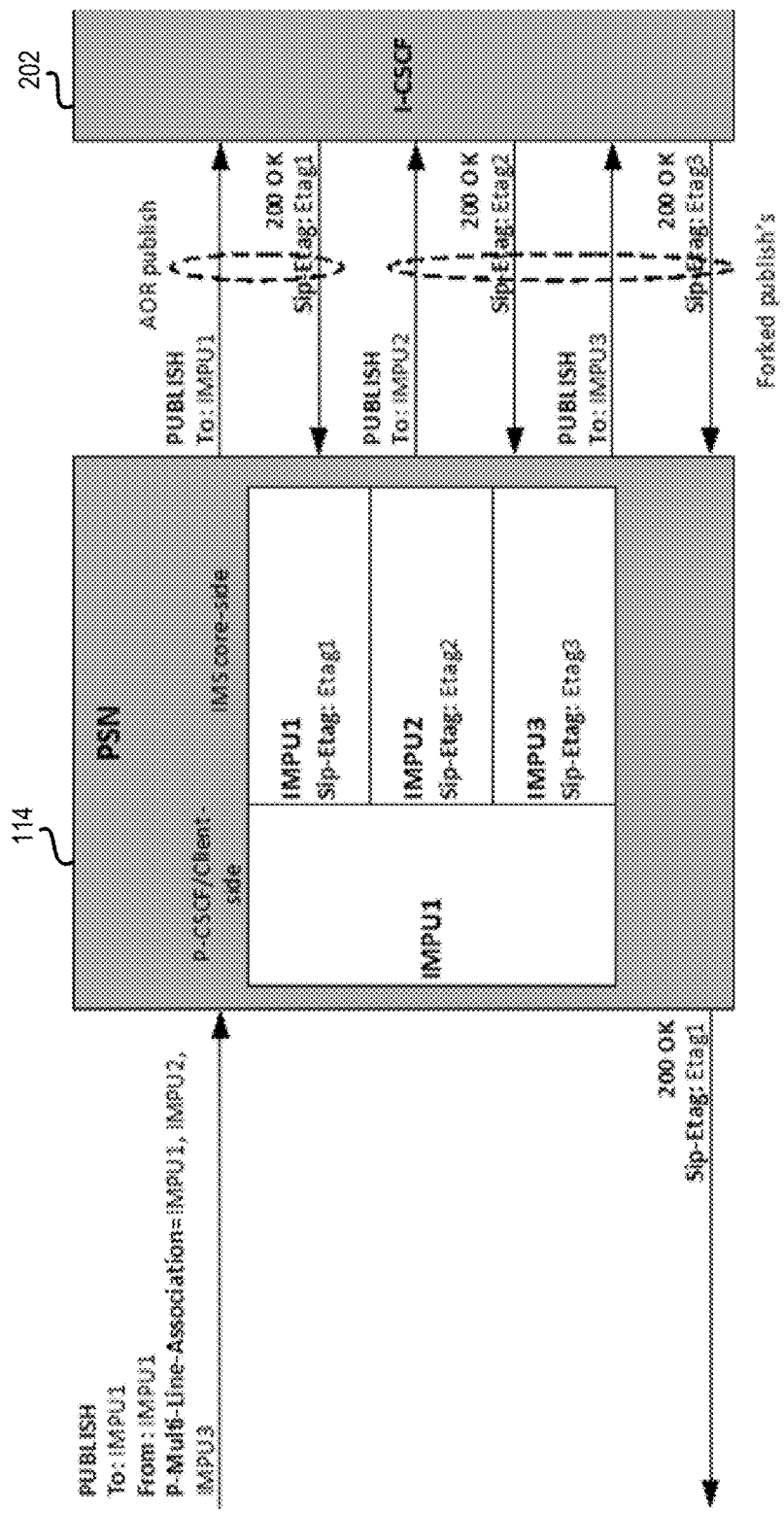
FIG. 3 illustrates a more detailed data flow diagram of an exemplary publish fork process according to the present disclosure.

FIGS. 2 and 3 illustrate publishing forking functions of PSN 114. In the illustrated example, PSN 114 publishes a PUBLISH message for leach line—MPU1, IMPU2 and IMPU3—for capabilities advertising. In the illustrated example, IMPU1 is the AoR of the device. This AoR in incoming PUBLISH to PSN 114 is considered a Primary Line for the purpose of service logic.

By way of example, when a device capable of MLMD functions or a device with a shared line performs a registration as described above, a publish request is sent to PSN 114 and PSN 114 sends device capability information to I-CSCF 202 for each device corresponding to a shared line.

FIG. 3 illustrates PSN 114 publish forking in greater detail, which is similar to the registration forking.

In operation, I-CSCF 202 sends each of the PUBLISH to a S-CSCF and S-CSCF executes an initial filter criteria (iFC) for each PUBLISH and selects the Presence Application Server (e.g., P-AS 118) for the given IMPU and sends it to the P-AS for capability discovery service usage. The P-AS accepts the PUBLISH for each of the users with PUBLISHed capabilities and generates a 200 OK response with "SIP-ETag" value for the client to use in refresh/modify PUBLISH or Un PUBLISH.

Similar to the registration process described above, PSN 114 waits until all the PUBLISH receive a final 2xx or final error response. Each line may be served by a distinct S-CSCF and distinct AS. Once PSN receives 200 OK for all PUBLISH requests it sent, it will remember the SIP-Etag values received in 200 OK for each line and towards the user will send the 200 OK response with the SIP-ETag value that was received for the main line AoR. The P-CSCF forwards the response to the client/UE as usual. FIG. 3 illustrates this aggregation of PUBLISH responses at PSN 114. The responses from I-CSCF show multiple IMPUs in P-Associated-URI header that are aggregated by PSN 114. In the illustrated example, PSN 114 maintains different PUBLISH SIP-ETag towards P-CSCF and IMS core for each line as shown in figure.

In the example, similar to the registration process, if another user activates the same line and publishes the line capabilities, the registration will be served by same S-CSCF and P-AS instances, because due to prior registration of same line, an S-CSCF is already assigned and hence the same AS will receive the PUBLISH for the same line and will support composition of capabilities. In summary all PUBLISH of same line in the network are served by same S-CSCF and same P-AS instances. At the end of the forked PUBLISH procedure the PSN is in path for subsequent PUBLISH related signaling.

The P-AS can check the "entity" element present within an xml body of the PUBLISH to detect that the PUBLISH is from a shared line and only device capabilities in the "service" element of the xml need to be used. The P-AS can also perform a custom composition policy of forming the superset of device capabilities of the capabilities published by a user's own devices and a user's shared line devices.

A peer user who wants to discover the communication set capabilities of the given user sends a SIP SUBSCRIBE to P-AS 118 as outlined in GSMA "Rich Communication Suite 5.1 Advanced Communications Services and Client Specification," the contents, to the extent they do not conflict with the present disclosure, are incorporated herein by reference, for Presence based Capability Discovery, P-AS 118 accepts this SIP SUBSCRIBE for the user by sending 200 OK response. P-AS 118 then includes the aggregated communication set capabilities of the user's own lines and shared lines as defined above and provides it to the peer user.

FIG. 4 illustrates a call flow diagram in accordance with further exemplary embodiments of the disclosure. In the illustrated example, UE A1 (e.g., belonging to user A) is capable of MLMD services as noted herein and UE B1 (e.g., belonging to user B) has activated a line associated with UE A1. UE A1 publishes its device capabilities—e.g., using a SIP PUBLISH, upon activation or connection with a network. The PUBLISH message then goes to the S-CSCF as described above. The S-CSCF will then check to see if information should be sent to the presence application server PS-A associated with UE A1. The PS-A then stores the presence information and returns an OK back to UE A1. At this stage, UE A1 has published its device capabilities.

Next, UE B1, on which the first user has shared a line, sends a PUBLISH to the network; a PSN receives the request. In the illustrated example, two publish messages are sent from the PSN (PUBLISH B and PUBLISH A). PUBLISH B will be stored on PS-B. PUBLISH A will be stored on PS-A, which in this case, already has information regarding UE A1. PS-A determines (e.g., based on an entity tag) that PUBLISH A is from a permissioned device of user B. An OK is returned to UE B1. In the illustrated example, PS-A handling a SUBSCRIBE by a watcher can apply standard OMA composition for PUBLISH/hard states doc done by user A's devices and custom composition policy for capabilities/availability for PUBLISH done on behalf of A by one or more permissioned lines.

The present invention has been described above with reference to a number of exemplary embodiments and examples. It should be appreciated that the particular embodiments shown and described herein are illustrative of the invention and its best mode and are not intended to limit in any way the scope of the invention as set forth in the claims. It will be recognized that changes and modifications may be made to the exemplary embodiments without departing from the scope of the present invention. These and other changes or modifications are intended to be included within the scope of the present invention, as expressed in the following claims.

We claim:

1. A communication system comprising:
a network configured to support a multi-line, multi-device service enabling at least one of (i) a single user device to use multiple lines of the network, and (ii) multiple user devices to use one line of the network, the network comprising:
a network contact point, wherein each user device of the network is communicatively coupled to the network contact point;
a proxy service node (PSN) communicatively coupled to the network contact point; and
at least one presence application server (PAS);
wherein at least one user device of the network comprises a client configured to allow a user to select for registration one or more lines from a plurality of lines available for the multi-line, multi-device service on the network;
wherein the PSN sends a publish message for each line registered by the user, the publish message comprising communication capability information of each registered line; and
wherein the at least one PAS receives the publish message for each registered line.

2. The communication system of claim 1, wherein the registration of a line corresponds to registration of an IMS Public User Identity (IMPU).

3. The communication system of claim 1, wherein the at least one user device comprises a client configured to display device capability information of at least one other device, the device capability information comprising information regarding registered lines associated with the at least one other device.

4. The communication system of claim 1, wherein the communication system further comprises an I-CSCF and an S-CSCF, wherein the I-CSCF sends the publish message for each registered line to the S-CSCF.

5. The communication system of claim 4, wherein each line is served by a separate S-CSCF.

6. The communication system of claim 4, wherein each line is served by a separate presence application server.

7. The communication system of claim 1, wherein the PSN aggregates a plurality of responses from an I-CSCF into a header.

8. The communication system of claim 1, wherein the at least one presence application server disseminates to a second user received communication capability information of each registered line.

9. The communication system of claim 1, wherein, in response to a request from a second user, the presence application server provides communication capabilities of at least one of (i) the user's registered lines, and (ii) the user's shared lines.

10. A communication method performed with the aid of a network configured to support a multi-line, multi-device service enabling at least one of (i) a single user device to use multiple lines of the network, and (ii) multiple user devices to use one line of the network, the method comprising the steps of:
using a client associated with a first user device of the network, enabling a first user to select for registration one or more lines from a plurality of lines available for the multi-line, multi-device service on the network;
sending, by a proxy service node (PSN) of the network, a publish message for each line registered by the user, the publish message comprising communication capability information of each registered line; and
receiving and storing the communication capability information of each registered line in a presence application server.

11. The communication method of claim 10, wherein the registration of a line corresponds to registration of an IMS Public User Identity (IMPU).

12. The communication method of claim 10, wherein at least one line registered by the user is shared with a second device.

13. The communication method of claim 10, wherein device capability information of the first user device is provided for display on a second user device, the device capability information comprising information regarding registered lines associated with the first user device.

14. The communication method of claim 13, wherein:
the registration of a line corresponds to registration of an IMS Public User Identity (IMPU);
the first user device registers a plurality of lines among the lines available for the multi-line, multi-device service on the network; and
the device capability information of the first user device associated with the plurality of registered lines is provided for display on the second user device.

15. The communication method of claim 14, wherein the proxy service node forks the publish messages corresponding to the plurality of registered lines.

16. The communication method of claim 10, wherein the proxy service node aggregates multiple publish messages.

17. The communication method of claim 10, wherein the proxy service node authorizes one or more lines for use on the first user device.

18. The communication method of claim 10, further comprising a step of using a client associated with a second user device to enable a second user to select for registration one or more lines from a plurality of lines available for the multi-line, multi-device service on the network, wherein at least one line registered by the second user is a shared line also registered by the first user.

* * * * *

UNITED STATES PATENT AND TRADEMARK OFFICE
CERTIFICATE OF CORRECTION

PATENT NO. : 9,913,252 B2
APPLICATION NO. : 14/992848
DATED : March 6, 2018
INVENTOR(S) : Vivek Basavaraj, Anish Sharma and Jyotirmay Bareria It is certified that error appears in the above-identified patent and that said Letters Patent is hereby corrected as shown below:

On the Title Page

Item (72) Please add the following inventors:
Shelby Seward, 12920 SE 38th Street, Bellevue, Washington, 98006 US;
Robert F. Piscopo Jr., 12920 SE 38th Street, Bellevue, Washington, 98006 US Signed and Sealed this
Twenty-seventh Day of October, 2020

Andrei Iancu
*Director of the United States Patent and Trademark Office*